(12) United States Patent
Zaman et al.

(10) Patent No.: US 12,072,350 B2
(45) Date of Patent: Aug. 27, 2024

(54) SUSPENSION FOR A MEMS VIBRATION SENSOR

(71) Applicant: Knowles Electronics, LLC, Itasca, IL (US)

(72) Inventors: Faisal Zaman, Naperville, IL (US); Shubham Shubham, Schaumburg, IL (US); Ken Deng, Schaumburg, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 17/847,979

(22) Filed: Jun. 23, 2022

(65) Prior Publication Data

US 2023/0417793 A1 Dec. 28, 2023

(51) Int. Cl.
*G01P 15/125* (2006.01)
*G01P 1/00* (2006.01)

(52) U.S. Cl.
CPC .............. *G01P 15/125* (2013.01); *G01P 1/00* (2013.01)

(58) Field of Classification Search
CPC .................................................... G01P 15/125
See application file for complete search history.

(56) References Cited

U.S. PATENT DOCUMENTS 8,413,509 B2 * 4/2013 Geisberger ............ G01P 15/125
73/514.32
2012/0186346 A1 * 7/2012 McNeil ................. G01P 15/125
73/514.32
2013/0255382 A1 * 10/2013 Tanaka .................. G01P 15/125
73/514.32
2018/0031601 A1 * 2/2018 Anac ................... G01C 19/5726

OTHER PUBLICATIONS

He, Y.; Si, C.; Han, G.; Zhao, Y.; Ning, J.; Yang, F. A Novel Fabrication Method for a Capacitive MEMS Accelerometer Based on Glass-Silicon CompositeWafers. Micromachines 2021, 12, 102. https://doi.org/10.3390/mi12020102. Received: Dec. 3, 2020. Accepted: Jan. 20, 2021. Published: Jan. 21, 2021.

* cited by examiner

*Primary Examiner* — Walter L Lindsay, Jr.
*Assistant Examiner* — Philip T Fadul
(74) *Attorney, Agent, or Firm* — Flener IP & Business Law; Zareefa B. Flener (57) ABSTRACT

An anchor assembly for a microelectromechanical systems (MEMS) vibration sensor suspension comprises an anchor body and at least one spring integrally extending from the anchor body. Each spring comprises a first section integrally extending at a first end away from the anchor body to a second end, and first lateral portions of second and third sections extending in opposite lateral directions from the second end. Each of the second and third sections includes a first leg that extends at a first end from the first lateral portion toward the anchor body, a second lateral portion that extends from a second end of the first leg away from the first section, and a second leg that extends from the second lateral portion at a first end away from the anchor body, wherein second ends of the second legs extend farther from the anchor body than the first lateral portions.

15 Claims, 7 Drawing Sheets

SUSPENSION FOR A MEMS VIBRATION SENSOR

FIELD OF THE DISCLOSURE

The present disclosure relates generally to a suspension for a microelectromechanical systems (MEMS) vibration sensor, and more particularly to a suspension that detects vibration in a plane normal to the sensor while rejecting vibration stimulus from other axes.

BACKGROUND

It is known that in the fabrication of MEMS devices often a plurality of devices are manufactured in a single batch process in the form of a wafer(s). Individual portions of the batch processed wafer(s) representative of individual MEMS devices are known as dies. Accordingly, a number of MEMS dies can be manufactured in a single batch processed wafer and then cut apart or otherwise separated for further fabrication steps or for their ultimate use, which for example without limitation includes use as a vibration sensor.

Traditional vibration sensor suspensions have a limited ability to isolate vibrations in a desired vibration mode from vibrations in other undesired vibration modes. Traditional vibration sensor suspensions suffer from high stress concentrations at the suspension anchor points causing them to break or otherwise fail when exposed to physical shocks or high displacement events. A need exists for a suspension for a vibration sensor that is environmentally robust and can detect vibrations in a desired direction while rejecting vibrations in undesired directions, while optimizing space and sensitivity.

DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

In the following detailed description, various embodiments are described with reference to the appended drawings. The skilled person will understand that the accompanying drawings are schematic and simplified for clarity. Like reference numerals refer to like elements or components throughout. Like elements or components will therefore not necessarily be described in detail with respect to each figure.

DETAILED DESCRIPTION

According to various embodiments described herein, an anchor assembly for a microelectromechanical systems (MEMS) vibration sensor suspension comprises an anchor body and at least one spring integrally extending from the anchor body. Each spring comprises a first section integrally extending at a first end away from the anchor body to a second end, and first lateral portions of second and third sections extending in opposite lateral directions from the second end. Each of the second and third sections includes a first leg that extends at a first end from the first lateral portion toward the anchor body, a second lateral portion that extends from a second end of the first leg away from the first section, and a second leg that extends from the second lateral portion at a first end away from the anchor body, wherein second ends of the second legs extend farther from the anchor body than the first lateral portions.

In an embodiment, a suspension for a MEMS vibration sensor comprises two anchor assemblies as described above, wherein the second ends of the second legs are configured to integrally connect a single proof mass between the two anchor assemblies along a connection axis with each first section extending along the connection axis toward the other first section. In an embodiment the suspension further comprises the proof mass, wherein the proof mass is a plate of material and is integrally connected to the two anchor assemblies within a common plane. In an embodiment the two anchor assemblies are integrally connected to the proof mass with the connection axis laterally offset from an edge of the proof mass. In an embodiment a resonance frequency for a mode of vibration of the proof mass rotating around the connection axis is about a third of the resonance frequency for any other mode of vibration. In an embodiment the suspension further comprises a fixed electrode disposed in a plane parallel to the common plane, wherein application of a bias voltage to the fixed electrode lowers the resonance frequency of the proof mass in the mode of vibration rotating around the connection axis.

In an embodiment, a suspension for a microelectromechanical systems (MEMS) vibration sensor comprises three anchor assemblies as described above, wherein a first anchor assembly includes a first anchor body integrally connected between first and second springs, a second anchor assembly includes a second anchor body integrally connected to a third spring, and a third anchor assembly includes a third anchor body integrally connected to a fourth spring. In an embodiment the three anchor assemblies are arranged along a support axis with the first anchor assembly disposed between the second and third anchor assemblies with the first spring facing the third spring and with the second spring facing the fourth spring. In an embodiment the second and third sections of the first, second, third, and fourth springs each further comprise a third lateral portion that extends from the second end of the second leg away from the first section. In an embodiment the third lateral portions of the third spring are configured to integrally connect to a first proof mass on a first side of the support axis and to a first support plate on an opposite second side of the support axis, the third lateral portions of the fourth spring are configured to integrally connect to a second proof mass on the second side of the support axis and to a second support plate on the first side of the support axis, the third lateral portions of the first spring are configured to integrally connect to the first proof mass on the first side of the support axis and to the first support plate on the second side of the support axis, and the third lateral portions of the second spring are configured to integrally connect to the second proof mass on the second side of the support axis and to the second support plate on the first side of the support axis. In an embodiment further comprising the first and second proof masses, the first proof mass is a plate of material and is integrally connected to the first and second anchor assemblies within a common plane, and wherein the second proof mass is a plate of material and is integrally connected to the first and third anchor assemblies within the common plane. In an embodiment the first and second anchor assemblies are integrally connected to the first proof mass along an edge of the first proof mass, and wherein the first and third anchor assemblies are integrally connected to the second proof mass along an edge of the second proof mass.

According to an embodiment a suspension for a microelectromechanical systems (MEMS) vibration sensor comprises three anchor assemblies according to claim 1, wherein a first anchor assembly includes a first anchor body integrally connected between first and second springs, a second anchor assembly includes a second anchor body integrally connected between third and fourth springs, and a third anchor assembly includes a third anchor body integrally connected between fifth and sixth springs. In an embodiment the three anchor assemblies are arranged along a support axis with the first anchor assembly disposed between the second and third anchor assemblies with the first spring facing the third spring and with the second spring facing the fifth spring, wherein the second and third sections of the first, second, third, and fifth springs each further comprise a third lateral portion that extends from the second end of the second leg away from the first section. In an embodiment the third lateral portions of the third spring are configured to integrally connect to a first proof mass on a first side of the support axis and to a first support plate on an opposite second side of the support axis, the third lateral portions of the fifth spring are configured to integrally connect to a second proof mass on the second side of the support axis and to a second support plate on the first side of the support axis. In an embodiment the third lateral portions of the first spring are configured to integrally connect to the first proof mass on the first side of the support axis and to the first support plate on the second side of the support axis, and the third lateral portions of the second spring are configured to integrally connect to the second proof mass on the second side of the support axis and to the second support plate on the first side of the support axis. In an embodiment the second ends of the second legs of the fourth spring are configured to integrally connect to a third proof mass, and the second ends of the second legs of the sixth spring are configured to integrally connect to a fourth proof mass. In an embodiment the suspension further comprises the first, second, third, and fourth proof masses, wherein the first proof mass is a plate of material and is integrally connected to the first and second anchor assemblies within a common plane, wherein the second proof mass is a plate of material and is integrally connected to the first and third anchor assemblies within the common plane, wherein the third proof mass is a plate of material and is integrally connected to the second anchor assembly within the common plane, and wherein the fourth proof mass is a plate of material and is integrally connected to the third anchor assembly within the common plane. In an embodiment the first and second anchor assemblies are integrally connected to the first proof mass along an edge of the first proof mass, wherein the first and third anchor assemblies are integrally connected to the second proof mass along an edge of the second proof mass, wherein the second anchor assembly is integrally connected to the third proof mass along an edge of the third proof mass, and wherein the third anchor assembly is integrally connected to the fourth proof mass along an edge of the fourth proof mass.

Figure 1:
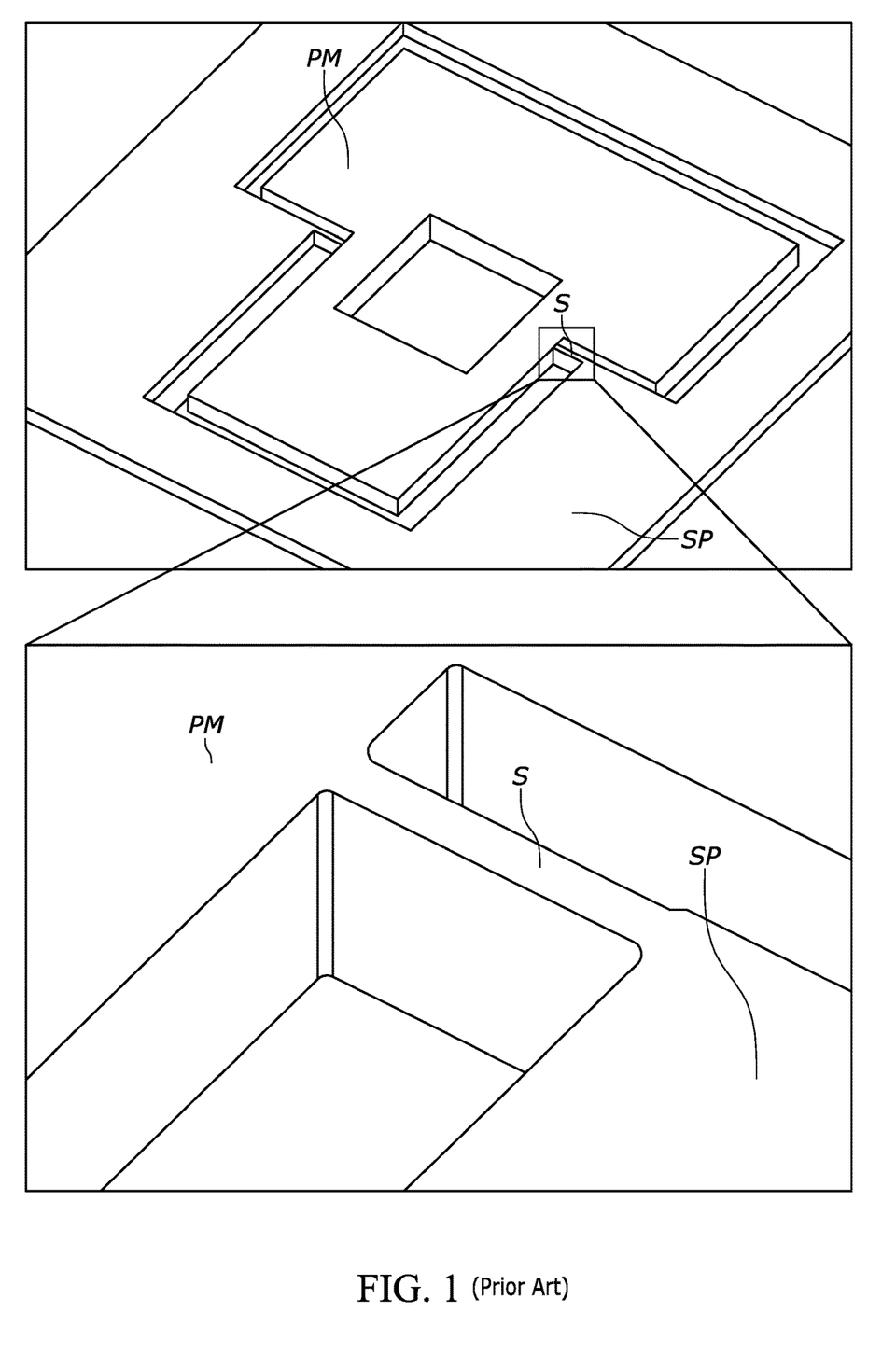
FIG. 1 is a prior art suspension for a vibration sensor.

A prior art suspension (S) for a vibration sensor including a proof mass (PM) supported by the suspension (S) on a support plate (SP) is illustrated in FIG. 1, wherein the right side is an enlargement of the portion of the right side within the small rectangular box. The prior art suspension (S) supports and allows vibration of the PM relative to an electrode surface (not shown) so that the changes in capacitance measured between the PM and the electrode surface can be detected, for example, as voltages, and amplified, thereby providing a way to sense the vibration of the PM. Without being held to theory, the prior art suspension S shown in FIG. 1 does not effectively isolate vibrations of the PM in a direction normal to the plane of the PM from vibrations in other directions. Further, the suspension S shown in FIG. 1 does not effectively absorb externally applied stresses caused by physical shocks or high displacement events and is therefore prone to breakage caused thereby.

Figure 2:
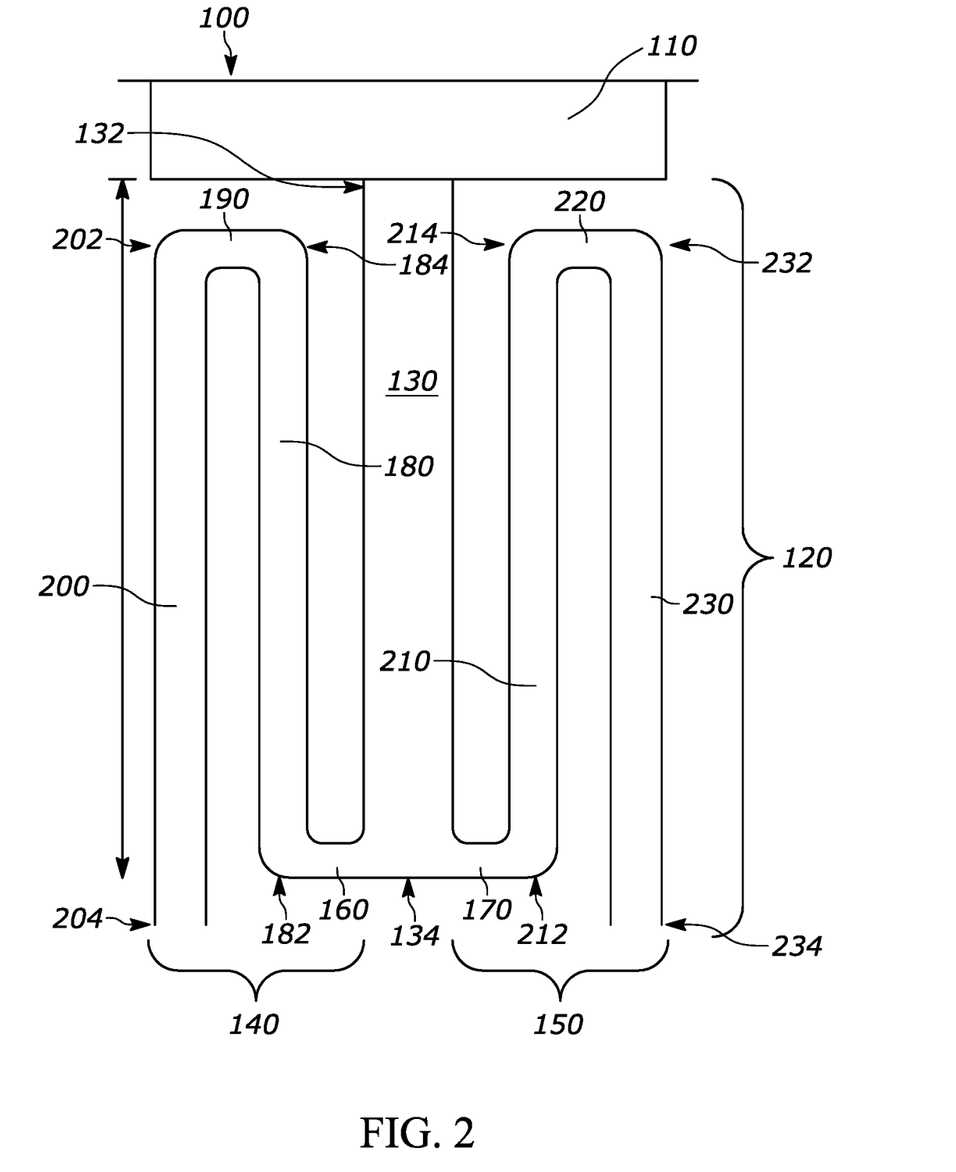
FIG. 2 is an anchor assembly for a microelectromechanical systems (MEMS) vibration sensor suspension according to an embodiment.

Referring now to FIG. 2, in an embodiment an anchor assembly 100 for a microelectromechanical systems (MEMS) vibration sensor suspension comprises an anchor body 110 and one or more springs 120 integrally extending from the anchor body 110. In an embodiment each of the one or more springs 120 comprises a first section 130 that integrally extends from the anchor body 110, wherein the first section includes a first end 132 proximate to the anchor body 110 and a second end 134 distal from the anchor body 110. In an embodiment each of the one or more springs 120 further comprises second and third sections 140,150, respectively as illustrated on opposite lateral sides of the first section 130. In an embodiment first lateral portions 160, 170 of the second and third sections 140, 150, respectively, extend in opposite lateral directions from the second end 134 of the first section 130.

In an embodiment the second section 140 includes a first leg 180 that extends from the first lateral portion 160 toward the anchor body 110, wherein the first leg 180 includes a first end 182 proximate to the first lateral portion 160 and a second end 184 distal from the first lateral portion 160. In an embodiment the second section 140 further includes a second lateral portion 190 that extends from the second end 184 of the first leg 180 away from the first section 130, and a second leg 200 that extends from the second lateral portion 190 away from the anchor body 110, wherein the second leg 200 includes a first end 202 proximate to the second lateral portion 190 and a second end 204 distal from the second lateral portion 190. Similarly, in an embodiment the third section 150 includes a first leg 210 that extends from the first lateral portion 170 toward the anchor body 110, wherein the first leg 210 includes a first end 212 proximate to the first lateral portion 170 and a second end 214 distal from the first lateral portion 170. In an embodiment the third section 150 further includes a second lateral portion 220 that extends from the second end 214 of the first leg 210 away from the first section 130, and a second leg 230 that extends from the second lateral portion 220 away from the anchor body 110, wherein the second leg 230 includes a first end 232 proximate to the second lateral portion 220 and a second end 234 distal from the second lateral portion 220. In an embodiment the second end 204 of the second leg 200 extends farther from the anchor body 110 than does the first lateral portion 160, and the second end 234 of the second leg 230 extends farther from the anchor body 110 than does the first lateral portion 170.

Figure 3:
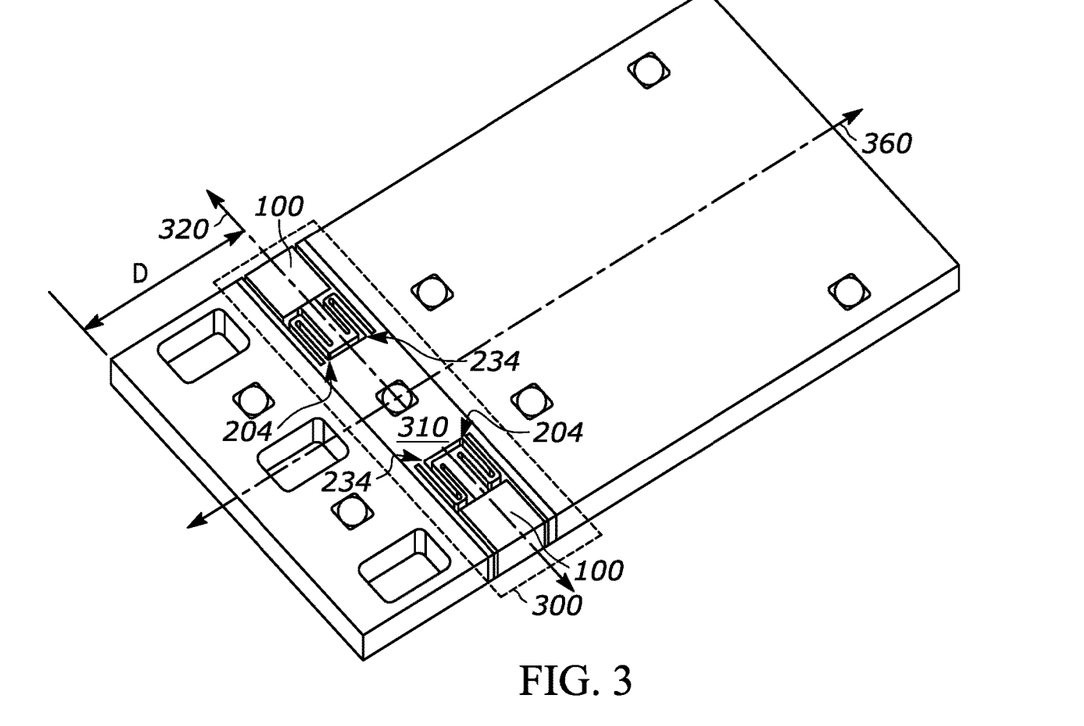
FIG. 3 is a suspension system and integrally connected proof mass according to an embodiment.
Figure 4:
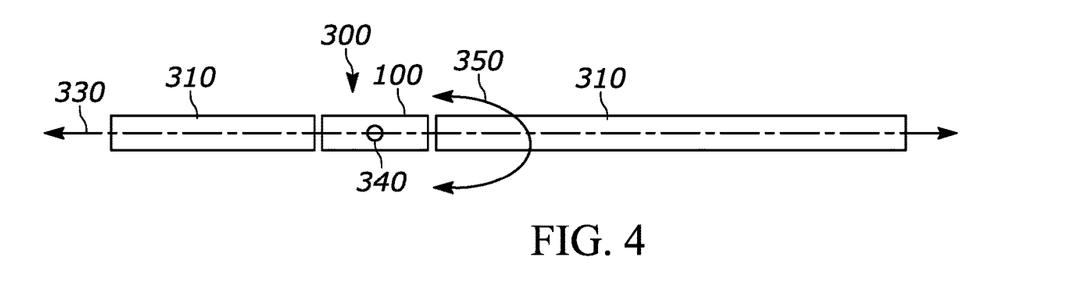
FIG. 4 is a side view of the suspension system and integrally connected proof mass of FIG. 3.

Referring now to FIGS. 3 and 4, an embodiment of a suspension 300 for a MEMS vibration sensor comprises the two anchor assemblies 100 shown within the dashed rectangle labeled 300. In an embodiment the second ends 204, 234 of the respective second legs 200, 230 (see FIG. 2) of each anchor assembly 100 are configured to integrally connect a single proof mass 310 between the two anchor assemblies 100 along a connection axis 320 with each first section 130 extending along the connection axis 320 toward the other first section 130.

In an embodiment the proof mass 310 is a plate of material, for example without limitation as illustrated in FIGS. 3 and 4, and is integrally connected to the two anchor assemblies 100 of the suspension 300 within a common plane 330. In an embodiment the two anchor assemblies 100 are integrally connected to the proof mass 310 with the connection axis 320 laterally offset, for example by a distance D, from an edge of the proof mass 310.

Referring to FIG. 4, the connection axis 320 is schematically shown end on as being within the circle 340. A first mode of vibration of the proof mass 310 rotating around the connection axis 320 is indicated by the curved double arrow 350. Without being held to theory it has been demonstrated that a resonance frequency for the mode of vibration of the proof mass 310 rotating around the connection axis 320 as indicated by the curved double arrow 350 is about a third of the resonance frequency for any other mode of vibration of the proof mass 310, for example, for torsional vibration of the proof mass 310 within the common plane 330, for translational vibration of the proof mass 310 within the common plane 330, and for out-of-plane torsional vibration rotating around the cross-axis 360 (see FIG. 3). Thus, the suspension 300 is effective in isolating vibrations in the first vibration mode 350 while also rejecting vibrations in other undesired vibration modes. In addition, the structure of the at least one spring 120 can absorb externally applied stresses caused by physical shocks or high displacement events far more effectively than the prior art suspension S, which makes any suspension utilizing the at least one spring 120 relatively more robust and capable of withstanding the physical shocks or high displacement events without breakage.

Figure 5:
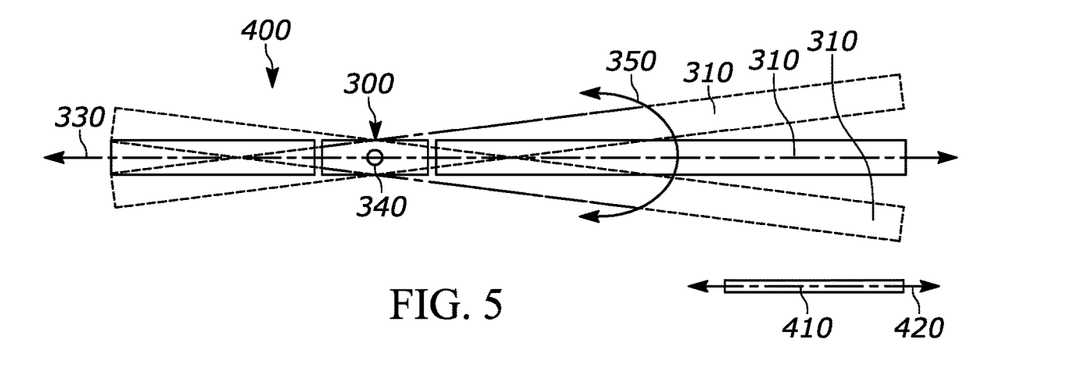
FIG. 5 is a side view of the suspension system and integrally connected proof mass of FIG. 3 further illustrating the addition of a fixed electrode.

Referring now to FIG. 5, in an embodiment a MEMS vibration sensor 400 comprises the proof mass 310 integrally connected to the suspension 300 allowing it to rotate around the connection axis 320 as indicated by the curved double arrow 350, and further including a fixed electrode 410 disposed in a plane 420 parallel to the common plane 330. In operation, vibrations of the proof mass 310 as illustrated by the dashed outlines of the proof mass 310 shown in FIG. 5 cause a change of capacitance between the proof mass 310 and the fixed electrode 410. A bias voltage is applied to the fixed electrode 410 so that the change in capacitance can be sensed as a change in voltage, which can be amplified for detection of the vibration. Without being held to theory, it has been found that the application of a bias voltage to the fixed electrode 410 lowers the resonance frequency of the proof mass 310 in the mode of vibration rotating around the connection axis 320 (a phenomenon known as electrostatic spring softening), but other modes of vibration of the proof mass 310 do not have an effective change in resonance frequency in response to the bias voltage.

Figure 6:
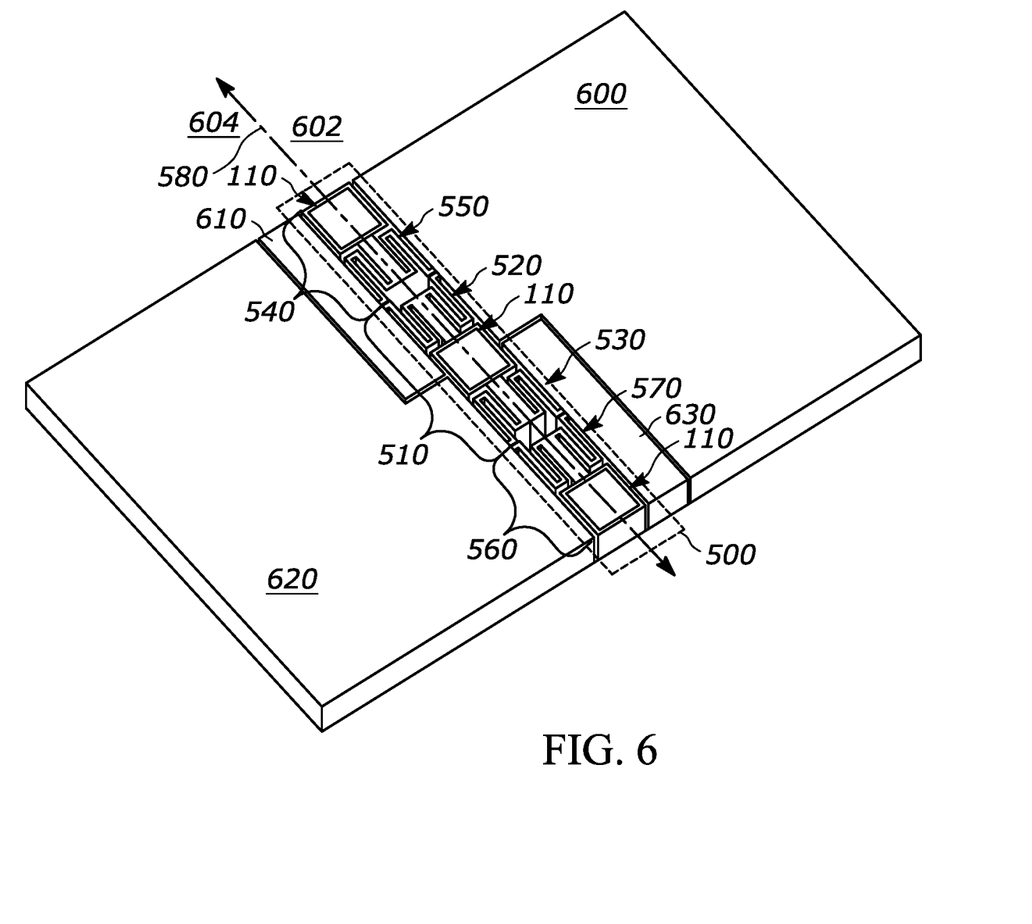
FIG. 6 is a suspension system and two integrally connected proof masses according to an embodiment.

Referring to FIG. 6, an embodiment of a suspension 500 indicated by the elements within the dashed box labeled 500 includes a first anchor assembly 510, a second anchor assembly 540, and a third anchor assembly 560. In this embodiment the first anchor assembly 510 includes a first anchor body 110 integrally connected between first and second springs 520, 530, a second anchor assembly 540 includes a second anchor body 110 integrally connected to a third spring 550, and a third anchor assembly 560 includes a third anchor body 110 integrally connected to a fourth spring 570. In an embodiment the first 510, second 540, and third 560 anchor assemblies are arranged along a support axis 580 with the first anchor assembly 510 disposed between the second 540 and third 560 anchor assemblies and with the first spring 520 facing the third spring 550 and with the second spring 530 facing the fourth spring 570.

Figure 7:
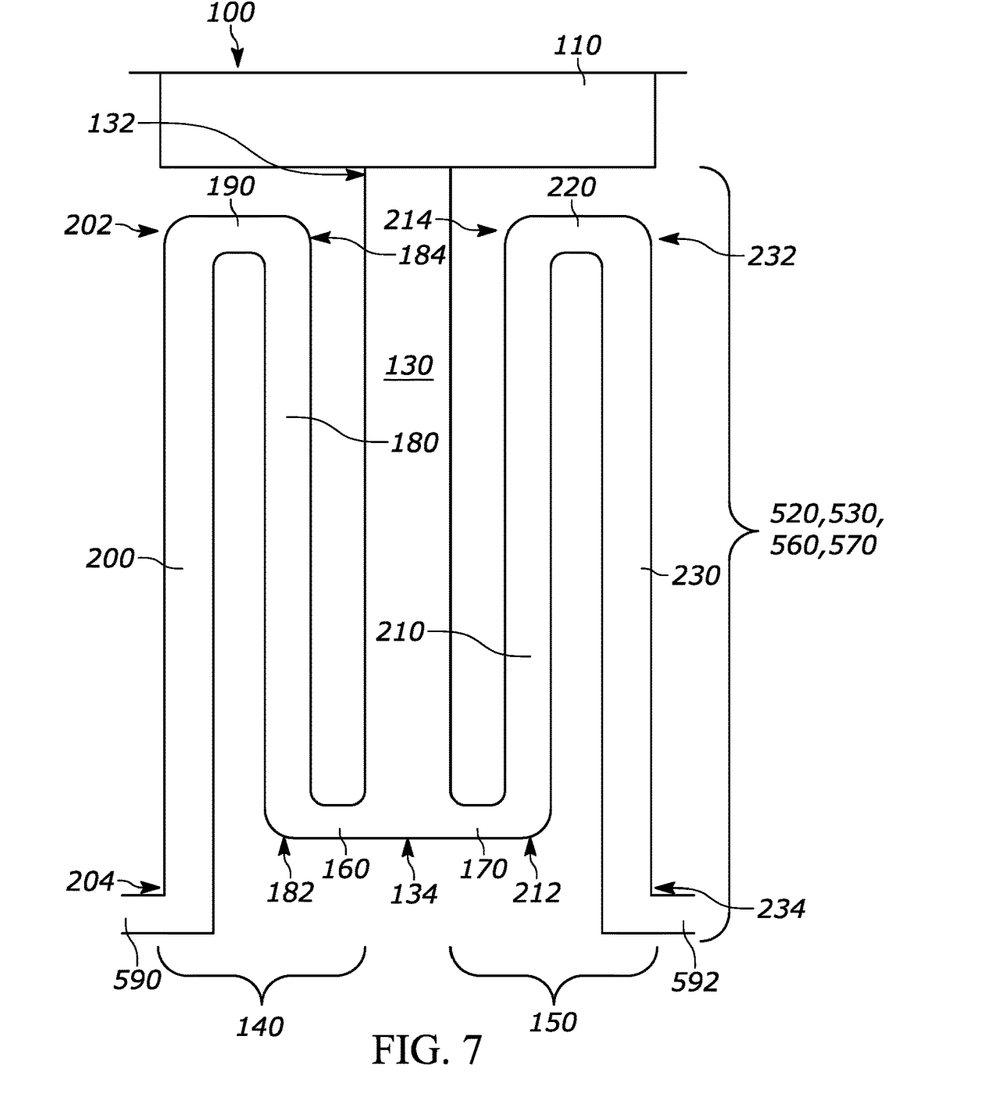
FIG. 7 is an anchor assembly for a MEMS vibration sensor suspension according to another embodiment.

Referring to FIGS. 6 and 7, in an embodiment the second section 140 of the first 520, second 530, third 560, and fourth 570 springs each further comprises a third lateral portion 590 that extends from the second end 204 of the second leg 200 away from the first section 130, and the third section 150 of the first 520, second 530, third 560, and fourth 570 springs each further comprises a third lateral portion 592 that extends from the second end 234 of the second leg 230 away from the first section 130.

In this embodiment, referring to FIGS. 6 and 7, the third lateral portion 592 of the third spring 550 is configured to connect to a first proof mass 600 on a first side 602 of the support axis 580 and the third lateral portion 590 of the third spring 550 is configured to connect to a first support plate 610 on an opposite second side 604 of the support axis 580. In this embodiment the third lateral portion 592 of the fourth spring 570 is configured to connect to a second proof mass 620 on the second side 604 of the support axis 580 and the third lateral portion 590 of the fourth spring 570 is configured to connect to a second support plate 630 on the first side 602 of the support axis 580.

Still referring to FIGS. 6 and 7, in this embodiment the third lateral portion 590 of the first spring 520 is configured to connect to the first proof mass 600 on the first side 602 of the support axis 580 and the third lateral portion 592 of the first spring 520 is configured to connect to the first support plate 610 on the second side 604 of the support axis 580. In this embodiment the third lateral portion 590 of the second spring 530 is configured to connect to the second proof mass 620 on the second side 604 of the support axis 580 and the third lateral portion 592 of the second spring 530 is configured to connect to the second support plate 630 on the first side 602 of the support axis. 580.

In an embodiment, all of the connections between the first, second, and third springs 510, 540, 560 and the first and second proof masses 600, 620 and also between the first, second, and third springs 510, 540, 560 and the first and second support plates 610, 630 are integral connections. For example, in an embodiment, all of the first, second, and third springs 510, 540, 560, the first and second proof masses 600, 620, and the first and second support plates 610, 630 are manufactured together by a layering of material.

Figure 8:
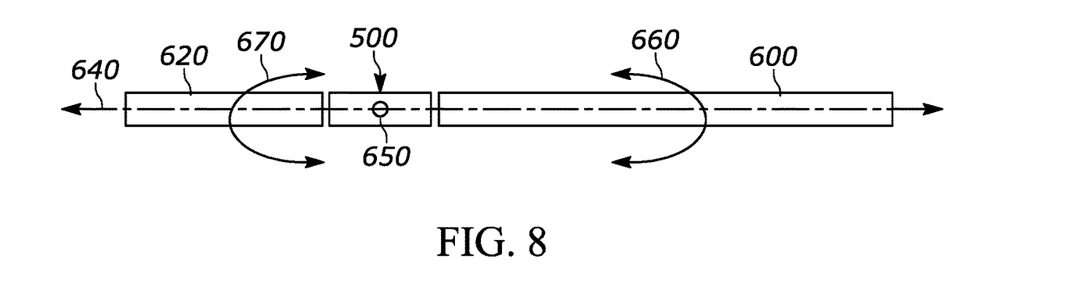
FIG. 8 is a side view of the suspension system and two integrally connected proof masses of FIG. 6.

Referring to FIGS. 6 and 8, in an embodiment the first proof mass 600 is a plate of material and is integrally connected to the first 510 and second 540 anchor assemblies of the suspension 500 within a common plane 640, and the second proof mass 620 is a plate of material and is integrally connected to the first 510 and third 560 anchor assemblies of the suspension 500 within the common plane 640. Referring to FIG. 8, the support axis 580 is schematically shown end on as being within the circle 650. A first mode of vibration of the first proof mass 600 rotating around the support axis 580 is indicated by the curved double arrow 660. Similarly, a first mode of vibration of the second proof mass 620 rotating around the support axis 580 is indicated by the curved double arrow 670. In this embodiment as shown in FIG. 6, the first 510 and second 540 anchor assemblies are integrally connected to the first proof mass 600 along an edge of the first proof mass, and the first 510 and third 560 anchor assemblies are integrally connected to the second proof mass 620 along an edge of the second proof mass 620.

Without being held to theory it has been demonstrated that the resonance frequencies for the modes of vibration of the first and second proof masses 600, 620 rotating around the support axis 580 as indicated by the curved double arrows 660, 670 shown in FIG. 8 are each about a third of the resonance frequency for any other mode of vibration of either of the first and second proof masses 600, 620, for example, for torsional vibration of the proof masses 600, 620 within the common plane 640, for translational vibration of the proof masses 600, 620 within the common plane 640, and for out-of-plane torsional vibration rotating around any other axis. Thus, the suspension 500 is effective in isolating vibrations in the first vibration modes 660, 670 while also rejecting vibrations in other undesired vibration modes. The embodiment of the suspension 500 when combined with a fixed electrode 410 disposed parallel to each proof mass 600, 620 (identically to that shown for the vibration sensor 400 in FIG. 5) to form a vibration sensor having two proof masses advantageously eliminates any dead space existent for the sensor 400 that utilizes a single proof mass 310. The use of two proof masses 600, 620 also increases the active area of the sensor and further optimizes the use of space.

Figure 9:
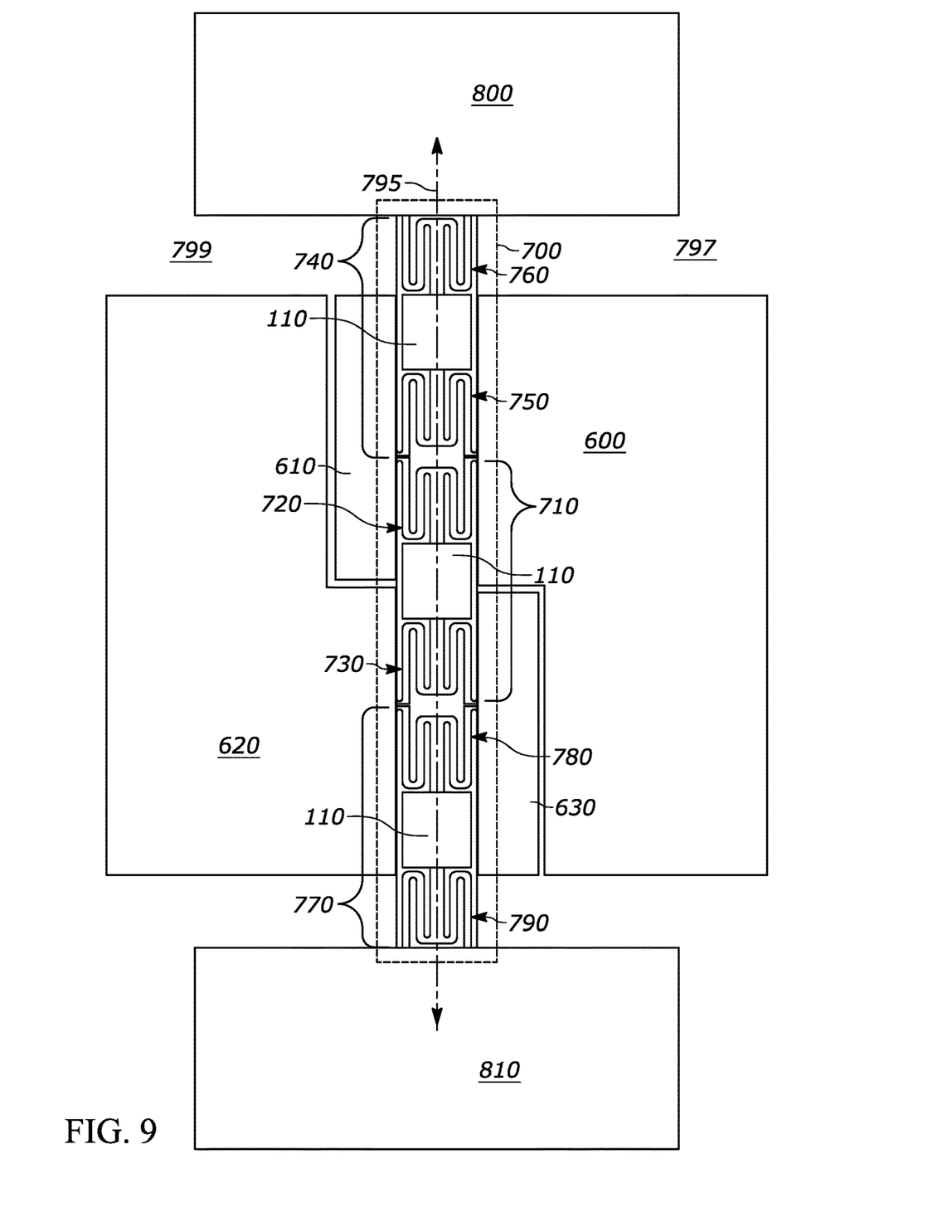
FIG. 9 is a suspension system and four integrally connected proof masses according to an embodiment.

Referring to FIG. 9, an embodiment of a suspension 700 indicated by the elements within the dashed box labeled 700 includes a first anchor assembly 710, a second anchor assembly 740, and a third anchor assembly 770. In this embodiment the first anchor assembly 710 includes a first anchor body 110 integrally connected between first and second springs 720, 730, a second anchor assembly 740 includes a second anchor body 110 integrally connected between third and fourth springs 750, 760, and a third anchor assembly 770 includes a third anchor body 110 integrally connected between fifth and sixth springs 780, 790.

In an embodiment the first 710, second 740, and third 770 anchor assemblies are arranged along a support axis 795 with the first anchor assembly 710 disposed between the second 740 and third 770 anchor assemblies and with the first spring 720 facing the third spring 750 and the second spring 730 facing the fifth spring 780. Referring to FIGS. 7 and 9, in an embodiment the second section 140 of each of the first 720, second 730, third 750, and fifth 780 springs each further comprises a third lateral portion 590 that extends from the second end 204 of the second leg 200 away from the first section 130, and the third section 150 of each of the first 720, second 730, third 750, and fifth 780 springs each further comprises a third lateral portion 592 that extends from the second end 234 of the second leg 230 away from the first section 130.

In this embodiment the third lateral portion 592 of the third spring 750 is configured to integrally to a first proof mass 600 on a first side 797 of the support axis 795 and the third lateral portion 590 of the third spring 750 is configured to connect to a first support plate 610 on an opposite second side 799 of the support axis 795. In this embodiment the third lateral portion 592 of the fifth spring 780 is configured to connect to a second proof mass 620 on the second side 799 of the support axis 795 and the third lateral portion 590 of the fifth spring 780 is configured to connect to a second support plate 630 on the first side 797 of the support axis 795. In this embodiment the third lateral portion 590 of the first spring 720 is configured to connect to the first proof mass 600 on the first side 797 of the support axis 795 and the third lateral portion 592 of the first spring 720 is configured to connect to the first support plate 610 on the second side 799 of the support axis 795. In this embodiment the third lateral portion 590 of the second spring 730 is configured to connect to the second proof mass 620 on the second side 799 of the support axis 795 and the third lateral portion 592 of the second spring 730 is configured to connect to the second support plate 630 on the first side 797 of the support axis 795.

Referring to FIG. 9, in this embodiment the second ends 204, 234 of the second legs 200, 300, respectively, of the fourth spring 760 are configured to connect to a third proof mass 800, and the second ends 204, 234 of the second legs 200, 300, respectively, of the sixth spring 790 are configured to connect to a fourth proof mass 810.

Figure 10:
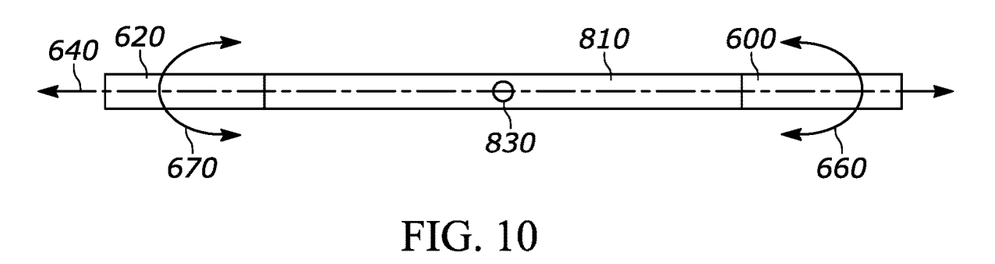
FIG. 10 is a side view of the suspension system and four integrally connected proof masses of FIG. 9 viewed along a support axis.
Figure 11:
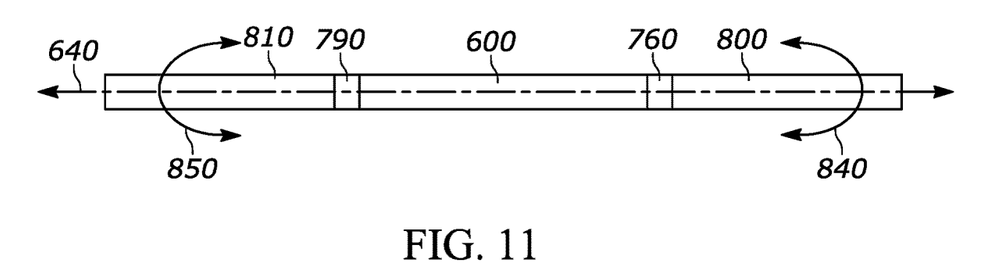
FIG. 11 is a side view of the suspension system and four integrally connected proof masses of FIG. 9 viewed perpendicular to the support axis.

The suspension 700 and proof masses 600, 620, 800, and 810 are shown in FIG. 11 from the right side relative to FIG. 9. Referring to FIGS. 9-11, in an embodiment the first proof mass 600 is a plate of material and is integrally connected to the first 710 and second 740 anchor assemblies of the suspension 700 within a common plane 640, and the second proof mass 620 (not visible in FIG. 11 but visible in FIGS. 9 and 10) is a plate of material and is integrally connected to the first 710 and third 770 anchor assemblies of the suspension 700 within the common plane 640. In an embodiment the third proof mass 800 is a plate of material and is integrally connected to the second 740 anchor assembly within the common plane 640, and the fourth proof mass 810 is a plate of material and is integrally connected to the third 790 anchor assembly within the common plane 640.

Referring to FIG. 10, the support axis 795 is schematically shown end on as being within the circle 830. A first mode of vibration of the first proof mass 600 rotating around the support axis 795 is indicated by the curved double arrow 660. Similarly, a first mode of vibration of the second proof mass 620 rotating around the support axis 795 is indicated by the curved double arrow 670. Referring to FIG. 11, a first mode of vibration of the third proof mass 800 rotating around the spring 760 is indicated by the curved double arrow 840. Similarly, a first mode of vibration of the fourth proof mass 810 rotating around the spring 790 is indicated by the curved double arrow 850.

In this embodiment as shown in FIG. 9, the first 710 and second 740 anchor assemblies are integrally connected to the first proof mass 600 along an edge of the first proof mass 600, the first 710 and third 770 anchor assemblies are integrally connected to the second proof mass 620 along an edge of the second proof mass 620, the second anchor assembly 740 is integrally connected to the third proof mass 800 along an edge of the third proof mass 800, and the third anchor assembly 770 is integrally connected to the fourth proof mass 810 along an edge of the fourth proof mass 810.

Without being held to theory it has been demonstrated that the resonance frequencies for the modes of vibration of the first and second proof masses 600, 620 rotating around the support axis 795 as indicated by the curved double arrows 660, 670 shown in FIG. 10 are each about a third of the resonance frequency for any other mode of vibration of either of the first and second proof masses 600, 620, for example, for torsional vibration of the proof masses 600, 620 within the common plane 640, for translational vibration of the proof masses 600, 620 within the common plane 640, and for out-of-plane torsional vibration rotating around any other axis. Further, it has been demonstrated that the resonance frequencies for the modes of vibration of the third and fourth proof masses 800, 810 rotating around the springs 760, 790, respectively, as indicated by the curved double arrows 840, 850, respectively, shown in FIG. 11 are each about a third of the resonance frequency for any other mode of vibration of either of the third and fourth proof masses 800, 810, for example, for torsional vibration of the proof masses 800, 810 within the common plane 640, for translational vibration of the proof masses 800, 810 within the common plane 640, and for out-of-plane torsional vibration rotating around any other axis. Thus, the suspension 700 is effective in isolating vibrations in the first vibration modes 660, 670, 840, 850 while also rejecting vibrations in other undesired vibration modes.

The embodiment of the suspension 700 can be combined with a fixed electrode 410 disposed parallel to each proof mass 600, 620, 800, 810 (identically to that shown for the vibration sensor 400 in FIG. 5) to form a vibration sensor. When used as part of such a vibration sensor, the suspension 700 illustrated in FIGS. 9-11 adds redundancy to the above prior described suspensions 300, 500, for example, because if one of the proof masses 600, 620, 800, or 810 fails or has a damaged connection to the suspension 700, the vibration sensor made using the four proof masses 600, 620, 800, or 810 would still work based on the remaining three proof masses.

As noted hereinabove, a plurality of MEMS devices can be manufactured in a single batch process. Individual portions of the batch process representative of individual MEMS devices are known as dies. Accordingly, a number of MEMS dies can be manufactured in a single batch process and then cut apart or otherwise separated for further fabrication steps or for their ultimate use, which for example without limitation includes as vibration sensor.

Steps in a production process utilized to produce the any of the suspensions 300, 500, 700 and their integrally connected proof masses (310, 600, 620, 800, 810) as described hereinabove include etching, masking, patterning, cutting, boring, and/or release steps executed on a workpiece. All of the steps are not described in detail herein. However, generally the portions of the workpiece that ultimately end up as the structure of the suspensions 300, 500, 700 and their integrally connected proof masses (310, 600, 620, 800, 810) are layered onto the workpiece using sacrificial material, or otherwise bored or etched out of a solid block of material.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A suspension for a microelectromechanical systems (MEMS) vibration sensor, the suspension comprising one or more anchor assemblies, each of the one or more anchor assemblies comprising:
    an anchor body and one or more springs integrally extending from the anchor body;
    wherein each of the one or more springs comprises:
        a first section integrally extending from the anchor body, the first section including a first end proximate to the anchor body and a second end distal from the anchor body;
        a second section and a third section, each of the second and third sections including a first lateral portion extending from the second end of the first section, a first leg that extends from the first lateral portion toward the anchor body, the first leg including a first end proximate to the first lateral portion and a second end distal from the first lateral portion, a second lateral portion that extends from the second end of the first leg away from the first section, and a second leg that extends from the second lateral portion away from the anchor body, the second leg including a first end proximate to the second lateral portion and a second end distal from the second lateral portion,
        wherein the first lateral portions of the second and third sections extend in opposite lateral directions, and
        wherein the second ends of the second legs extend farther from the anchor body than the first lateral portions; and
    wherein the one or more anchor assemblies comprises a plurality of anchor assemblies, the suspension further comprising a proof mass connected to the second legs of each of the plurality of anchor assemblies, wherein the plurality of anchor assemblies are connected along a connection axis with each first section extending along the connection axis toward the first section of one of the each of the one or more springs.

2. The suspension of claim 1, wherein the proof mass is a plate of material and is integrally connected to the plurality of anchor assemblies within a common plane.

3. The suspension of claim 2, wherein each of the plurality of anchor assemblies is integrally connected to the proof mass with the connection axis laterally offset from an edge of the proof mass.

4. The suspension of claim 3, wherein a resonance frequency for a mode of vibration of the proof mass rotating around the connection axis is about a third of the resonance frequency for a torsional mode of vibration of the proof mass within the common plane, for a translational mode of vibration of the proof mass within the common plane, or for a torsional mode of vibration out of the common plane around an axis perpendicular to the connection axis.

5. The suspension of claim 3, further comprising a fixed electrode disposed in a plane parallel to the common plane, wherein application of a bias voltage to the fixed electrode lowers the resonance frequency of the proof mass in the mode of vibration rotating around the connection axis.

6. The suspension of claim 1, further comprising a first proof mass, a second proof mass, a first support plate, and second support plate,
    wherein the one or more anchor assemblies comprise a first anchor assembly, a second anchor assembly, and a third anchor assembly, wherein the one or more springs of the first anchor assembly comprise a first spring and a second spring, and the anchor body of the first anchor assembly is connected between the first and second springs, wherein the one or more springs of the second anchor assembly comprise a third spring, and the anchor body of the second anchor assembly is connected to the third spring, wherein the one or more springs of the third anchor assembly comprise a fourth spring, and the anchor body of the third anchor assembly is connected to the fourth spring;

wherein the first, second, and third anchor assemblies are arranged along a support axis with the first anchor assembly disposed between the second and third anchor assemblies with the first spring facing the third spring and with the second spring facing the fourth spring;

wherein the second and third sections of the first, second, third, and fourth springs each further comprise a third lateral portion that extends from the second end of the second leg away from the first section;

wherein the third lateral portions of the third spring connect to the first proof mass on a first side of the support axis and to the first support plate on an opposite second side of the support axis, the third lateral portions of the fourth spring connect to the second proof mass on the second side of the support axis and to a second support plate on the first side of the support axis; and wherein the third lateral portions of the first spring connect to the first proof mass on the first side of the support axis and to the first support plate on the second side of the support axis, and the third lateral portions of the second spring connect to the second proof mass on the second side of the support axis and to the second support plate on the first side of the support axis.

7. The suspension of claim 6, wherein the first proof mass is a plate of material and is integrally connected to the first and second anchor assemblies within a common plane, and wherein the second proof mass is a plate of material and is integrally connected to the first and third anchor assemblies within the common plane.

8. The suspension of claim 7, wherein the first and second anchor assemblies are integrally connected to the first proof mass along an edge of the first proof mass, and wherein the first and third anchor assemblies are integrally connected to the second proof mass along an edge of the second proof mass.

9. The suspension of claim 1, further comprising a first proof mass, a second proof mass, a third proof mass, a fourth proof mass, a first support plate, and a second support plate,
wherein the one or more anchor assemblies comprise a first anchor assembly, a second anchor assembly, and a third anchor assembly,
wherein the one or more springs of the first anchor assembly comprise a first spring and a second spring, and the anchor body of the first anchor assembly is connected between first and second springs,
wherein the one or more springs of the second anchor assembly comprise a third spring and a fourth spring, and the anchor body of the second anchor assembly is connected between third and fourth springs,
wherein the one or more springs of the third anchor assembly comprise a fifth spring and a sixth spring, and the anchor body of the third anchor assembly is connected between fifth and sixth springs;
wherein the first, second, and third anchor assemblies are arranged along a support axis with the first anchor assembly disposed between the second and third anchor assemblies with the first spring facing the third spring and with the second spring facing the fifth spring;
wherein the second and third sections of the first, second, third, and fifth springs each further comprise a third lateral portion that extends from the second end of the second leg away from the first section;
wherein the third lateral portions of the third spring connect to the first proof mass on a first side of the support axis and to the first support plate on an opposite second side of the support axis, the third lateral portions of the fifth spring connect to the second proof mass on the second side of the support axis and to the second support plate on the first side of the support axis;
wherein the third lateral portions of the first spring connect to the first proof mass on the first side of the support axis and to the first support plate on the second side of the support axis, and the third lateral portions of the second spring connect to the second proof mass on the second side of the support axis and to the second support plate on the first side of the support axis;
wherein the second ends of the second legs of the fourth spring connect to the third proof mass, and the second ends of the second legs of the sixth spring connect to the fourth proof mass.

10. The suspension of claim 9, wherein the first proof mass is a plate of material and is integrally connected to the first and second anchor assemblies within a common plane, wherein the second proof mass is a plate of material and is integrally connected to the first and third anchor assemblies within the common plane, wherein the third proof mass is a plate of material and is integrally connected to the second anchor assembly within the common plane, and wherein the fourth proof mass is a plate of material and is integrally connected to the third anchor assembly within the common plane.

11. The suspension of claim 10, wherein the first and second anchor assemblies are integrally connected to the first proof mass along an edge of the first proof mass, wherein the first and third anchor assemblies are integrally connected to the second proof mass along an edge of the second proof mass, wherein the second anchor assembly is integrally connected to the third proof mass along an edge of the third proof mass, and wherein the third anchor assembly is integrally connected to the fourth proof mass along an edge of the fourth proof mass.

12. A suspension for a microelectromechanical systems (MEMS) vibration sensor, comprising:
a first anchor assembly and a second anchor assembly, wherein each anchor assembly comprises:
an anchor body and a spring integrally extending from the anchor body;
wherein each spring comprises:
a first section integrally extending from the anchor body, the first section including a first end proximate to the anchor body and a second end distal from the anchor body;
a second section and a third section, each of the second and third sections including a first lateral portion extending from the second end of the first section, a first leg that extends from the first lateral portion toward the anchor body, the first leg including a first end proximate to the first lateral portion and a second end distal from the first lateral portion, a second lateral portion that extends from the second end of the first leg away from the first section, and a second leg that extends from the second lateral portion away from the anchor body, the second leg including a first end proximate to the second lateral portion and a first end distal from the second lateral portion, wherein the first lateral portions of the second and third sections extend in opposite lateral directions, and wherein second ends of the second legs extend farther from the anchor body than the first lateral portions; and wherein the second ends of the second legs are configured to integrally connect a single proof mass connected between the first and second anchor assemblies, wherein the plurality of anchor assemblies are connected along a connection axis with each first section extending along the connection axis toward the first section of one of the each of the one or more springs.

13. The suspension of claim 12, further comprising the proof mass, wherein the proof mass is a plate of material, wherein the proof mass is integrally connected to the two anchor assemblies within a common plane, and wherein the two anchor assemblies are integrally connected to the proof mass with the connection axis laterally offset from an edge of the proof mass.

14. A suspension for a vibration sensor, comprising:
a first anchor assembly, a second anchor assembly, and a third anchor assembly,
wherein each anchor assembly comprises:
an anchor body and at least one spring integrally extending from the anchor body;
wherein each spring comprises:
a first section integrally extending from the anchor body, the first section including a first end proximate to the anchor body and a second end distal from the anchor body;
a second section and a third section, each of the second and third sections including a first lateral portion extending from the second end of the first section, a first leg that extends from the first lateral portion toward the anchor body, the first leg including a first end proximate to the first lateral portion and a second end distal from the first lateral portion, a second lateral portion that extends from the second end of the first leg away from the first section, and a second leg that extends from the second lateral portion away from the anchor body, the second leg including a first end proximate to the second lateral portion and a second end distal from the second lateral portion,
wherein the first lateral portions of the second and third sections extend in opposite lateral directions, and wherein second ends of the second legs extend farther from the anchor body than the first lateral portions;

wherein a first anchor assembly includes a first anchor body integrally connected between first and second springs, a second anchor assembly includes a second anchor body integrally connected to a third spring, and a third anchor assembly includes a third anchor body integrally connected to a fourth spring;

wherein the first, second, and third anchor assemblies are arranged along a support axis with the first anchor assembly disposed between the second and third anchor assemblies with the first spring facing the third spring and with the second spring facing the fourth spring;

wherein the second and third sections of the first, second, third, and fourth springs each further comprise a third lateral portion that extends from the second end of the second leg away from the first section;

wherein the third lateral portions of the third spring are configured to integrally connect to a first proof mass on a first side of the support axis and to a first support plate on an opposite second side of the support axis, the third lateral portions of the fourth spring are configured to integrally connect to a second proof mass on the second side of the support axis and to a second support plate on the first side of the support axis; and wherein the third lateral portions of the first spring are configured to integrally connect to the first proof mass on the first side of the support axis and to the first support plate on the second side of the support axis, and the third lateral portions of the second spring are configured to integrally connect to the second proof mass on the second side of the support axis and to the second support plate on the first side of the support axis.

15. The suspension of claim 14, further comprising the first and second proof masses, wherein the first proof mass is a plate of material and is integrally connected to the first and second anchor assemblies within a common plane, wherein the second proof mass is a plate of material and is integrally connected to the first and third anchor assemblies within the common plane, wherein the first and second anchor assemblies are integrally connected to the first proof mass along an edge of the first proof mass, and wherein the first and third anchor assemblies are integrally connected to the second proof mass along an edge of the second proof mass.

* * * * *